Figure 1:
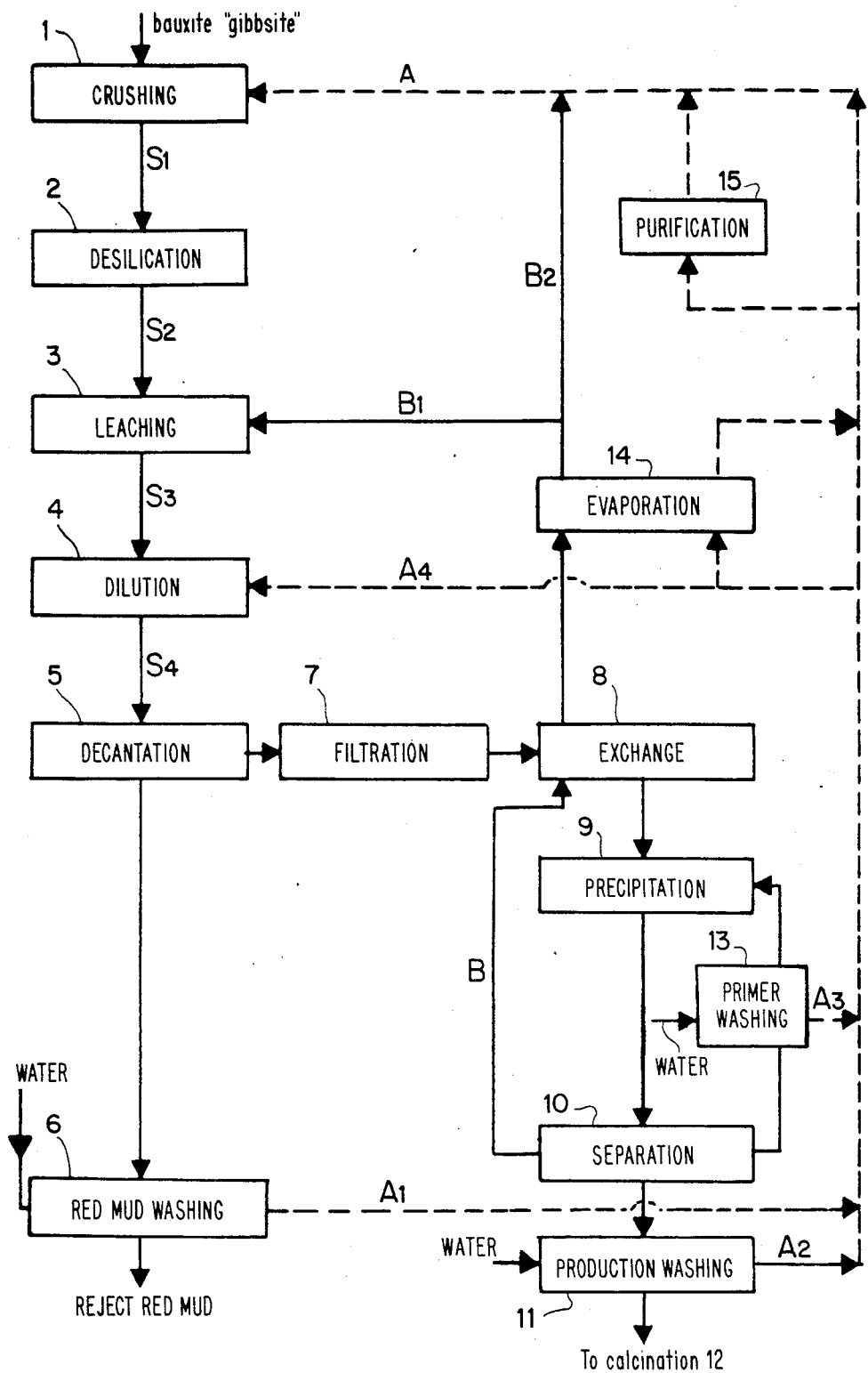

United States Patent [19]
Lepetit et al.

[11] Patent Number: 4,650,653
[45] Date of Patent: Mar. 17, 1987

[54] PRODUCTION OF ALUMINA FROM GIBBSITE-BEARING BAUXITE OF LOW REACTIVE SILICA CONTENT

[75] Inventors: Jean Lepetit; Jacques Mordini, both of Aix en Provence, France

[73] Assignee: Aluminium Pechiney, Paris, France

[21] Appl. No.: 857,316

[22] Filed: Apr. 30, 1986

[30] Foreign Application Priority Data

Apr. 30, 1985 [FR] France ................ 85 06879

[51] Int. Cl.⁴ .............................. C01F 7/06
[52] U.S. Cl. .................... 423/121; 423/127; 423/130
[58] Field of Search ............ 423/121, 122, 127

[56] References Cited
U.S. PATENT DOCUMENTS 4,426,363 1/1984 Yamada et al. .............. 423/119
4,519,989 5/1985 Pearson et al. .............. 423/121

*Primary Examiner*—H. T. Carter
*Attorney, Agent, or Firm*—Dennison, Meserole, Pollack & Scheiner

[57] ABSTRACT

Process for the low-temperature treatment according to the Bayer cycle of gibbsite-bearing bauxite of low reative silica content, involving desilication of the said bauxite before leaching, by a liquor of low caustic soda concentration and characterized in that this sodium liquor consists of one or more washing waters originating from the Bayer cycle, mixed or otherwise with leaching liquor, wherein the weighted reactive silica content is preferably lower than 5% of the alumina content of the bauxite and the concentration of the sodium liquor used for desilication ranges from 50 to 120 g/liter of $Na_2O$ caustic.

8 Claims, 1 Drawing Figure

PRODUCTION OF ALUMINA FROM GIBBSITE-BEARING BAUXITE OF LOW REACTIVE SILICA CONTENT

TECHNICAL FIELD

The present invention concerns the treatment, according to the Bayer process, of bauxite containing alumina principally in the form of gibbsite and a certain proportion of silica in the state of alumina silicate or in any other form readily soluble in a sodium aluminate liquor such as is encountered in the Bayer process.

PREVIOUS STATE OF THE ART

The Bayer process, widely described in specialised literature, constitutes the essential technique for the production of alumina intended to be transformed into aluminium by igneous electrolysis.

According to this process, the bauxite mineral is hot-treated by means of an aqueous solution of sodium hydroxide of suitable concentration, thus causing solubilisation of the alumina and the obtention of a supersaturated solution of sodium aluminate.

After separation of the solid phase, constituting the unleached residue (red mud) of the mineral, the supersaturated solution of sodium aluminate is seeded with particles of aluminium trihydroxide in order to bring about precipitation of the aluminium trihydroxide. The sodium aluminate liquor poor in alumina, known as the decomposed liquor, is recycled at the leaching stage after having been concentrated and recharged with sodium hydroxide in order to provide a liquor, known as the leaching liquor, the concentration of which is appropriate to the leaching of the mineral.

It is well known by professionals that according to the degree of hydration and the mineralogical structure of the alumina, on the one hand, and the nature and content of impurities present in the bauxite, on the other hand, silica, iron oxides and titanium in particular, the conditions of treatment should be adapted. Thus, bauxites containing alumina in the monohydrate state (Boehmite, diaspore) are treated in the Bayer cycle at temperatures in excess of 200° C., whereas bauxites containing alumina in the trihydrate state, such as gibbsite, are treated at much lower temperatures, usually ranging from 100° to 170° C. In the latter case, in effect, the gibbsite is easily extracted from the bauxite by means of the sodium aluminate liquor (Bayer liquor).

The extraction yields of solubilisable alumina corresponding to alumina in the trihydrate state generally exceed 90%, if the unfavourable influence of certain impurities such as silica is properly controlled.

In effect, silica can be present in the bauxite in several mineralogical forms unequally soluble in the sodium hydroxide. Certain mineralogical forms, of which Kaolin ($Al_2O_3$, $2SiO_2$, $2H_2O$) is the type most widespread, are solubilised at the same time as the gibbsite contained in the bauxite.

The term "reactive silica" is commonly applied to that part of the silica present in the bauxite in one of these forms, expressed as $SiO_2$. It usually accounts for 0.5 to 7% of the dry bauxite weight. In the presence of a sodium liquor, the reactive silica is first solubilised then re-precipitated in the form of sodium silico-aluminate of low solubility.

The silica concentration in the sodium liquor is determined by the solubility balance of the sodium silico-aluminate at the end of a very long time. During industrial treatment of a gibbsite-bearing bauxite, it is unusual for the solubility balance of the sodium silico-aluminate to be achieved. Usually, the silica concentration in the sodium liquor is higher, indeed much higher, than the solubility balance of the sodium silico-aluminate. This concentration is linked, therefore, both to the solubility balance of the sodium silico-aluminate and to the latter's precipitation kinetics. This kinetic activity is slower the lower the reactive silica content of the bauxite, since the sodium silico-aluminate precipitation reaction is favoured by the presence of the product of the reaction.

In the Bayer cycle, the silica concentration in the alumina-enriched liquor at the end of treatment of the bauxite is an important factor, since its level determines that of the leaching liquor as well as that of the silicon impurity in the alumina product. It is therefore advisable in most cases to combine the alumina extraction process, at the time of leaching of the bauxite, with a process known as "desilication" of the sodium liquor, with the aim of reducing the silica concentration in this liquor and therefore the level of silicon impurity in the alumina product.

This desilication process is usually carried out during leaching of the bauxite or in the course of a separate operation preceding or following such leaching (U.S. Pat. Nos. 341,307 and 4,426,363).

Desilication processes have in common the fact that they use all or part of the decomposed Bayer liquor, at concentrations of $Na_2O$ caustic ranging from 100 to 200 g/liter and at temperatures ranging from 80° C. to 200° C. according to the nature of the treated bauxite. They make it possible to obtain successful desilication performances with bauxites containing more than 2.5% of reactive silica.

On the other hand, the application of the previous art to the treatment at low and medium temperature of gibbsite-bearing bauxites and reactive silica content of which is lower than this limit necessitates very long times of contact of the bauxite with the sodium liquor, as shown by the following comparative tests carried out by the claimant.

EXAMPLE 1

Leaching at low temperature followed by desilication. Application to a gibbsite-bearing bauxite of the following composition expressed as a percentage of the dry bauxite weight:

$Al_2O_3$; 51.3%,
$SiO_2$ total; 3.8%,
$SiO_2$ reactive; 2.8%.

Leaching at 107° C. for 1.½ hours by a liquor at 140 g $Na_2O$ caustic per liter and in the proportion of 1 tonne of bauxite per 6.5 m³ of leaching liquor. Desilication after leaching for 6 hours at 104° C.

At this stage:

The weighted ratio $Rp = Al_2O_3$ concentration/$Na_2O$ caust. concentration of liquor = 1.06 and the ratio of the silica concentration in the liquor to the caustic soda concentration is 0.64%.

The ratio of $SiO_2$ concentration of liquor/$Na_2O$ caust. concentration of liquor makes it possible to characterise throughout the various stages of the Bayer cycle the soluble silica content independently of variations in the $Na_2O$ caustic concentration of the liquor, expressed in grammes per liter. In the present case, the 0.64% content makes it possible to ensure that the silicon content of the aluminium product is lower than 100 ppm relative to $Al_2O_3$, this being the upper limit generally accepted for the manufacture of aluminium.

EXAMPLE 2

Simultaneous leaching and desilication at low temperature. Application to the same gibbsite-bearing bauxite as in Example 1.

In the same proportions as Example 1, leaching and desilication with liquor at 150 g $Na_2O$ caust./liter and at 145° C. for 1.½ hours.

At this stage:
Rp=1.21.

The ratio of soluble silica concentration to $Na_2O$ caustic concentration is 0.62%.

For the following examples, a bauxite with a lower reactive silica content was used. In this case, the effectiveness of desilication calls for much longer reaction times, and this has a particular bearing on the cost of the desilication plant.

EXAMPLE 3

Low temperature leaching followed by desilication. Application to a bauxite of the following composition:
$Al_2O_3$; 47.5%,
$SiO_2$ reactive; 1.0%.

Leaching at 107° C. for 2 hours by a liquor at 200 g $Na_2O$ caustic per liter and in the proportion of 1 tonne of bauxite for 6.5 m³ of leaching liquor. Dilution at 140 g $Na_2O$ caustic per liter and desilication for 20 hours at 104° C.

At this stage:
Rp=1.05.

Ratio of soluble silica concentration to $Na_2O$ caustic concentration: 0.63%. In the present case, by comparison with Example 1 with identical yield and quality of material, the installed capacity should be trebled to ensure the same production.

EXAMPLE 4

Simultaneous leaching and desilication at mean temperature. Application to the same bauxite as in Example 3 with the same bauxite/liquor proportions in the suspension.

Leaching and desilication at 140° C. by a liquor at 150 g $Na_2O$ caustic/liter for 3 hours.

At this stage:
Rp=1.14.
and the ratio of soluble silica concentration to $Na_2O$ caustic is 0.64%.

By comparison with Example 2, the installed capacity should be doubled to ensure the same production, and furthermore a reduction occurs in leaching productivity since Rp changes from 1.21 to 1.14. This drop is attributable to the increased desilication time necessitated by the low reactive silica content.

EXAMPLE 5

Low temperature desilication followed by medium temperature leaching. Application to the same gibbsite-bearing bauxite as in Examples 3 & 4.

desilication: placing in suspension of the bauxite at the rate of 1 tonne per 1.5 m³ of liquor at 150 g $Na_2O$ caustic per liter at 100° C. for 6 hours.

leaching with the same liquor at 140° C. for 20 minutes at the rate of 4 m³ per tonne of bauxite in suspension in the desilicated liquor.

At this stage:
Rp=1.16.

and ratio of silica concentration to $Na_2O$ caust. concentration=0.62%.

The claimant noted that, in the course of the lengthy desilication processes, a significant part of the gibbsite contained in the bauxite was lost.

This loss, which in the case of the preceding examples accounted for around 1.5 to 2% of alumina extractible by leaching, was attributed to the precipitation, also called retrogradation, of non-soluble aluminium monohydroxide under leaching conditions intended solely for the solubilisation of the gibbsite.

In the case of desilications undertaken with bauxites having a higher silica content, this condition did not become apparent in a significant manner, no doubt because of the short desilication times.

OBJECT OF THE INVENTION

In view of the aforesaid disadvantages, the claimant has developed a process for the treatment of gibbsite-bearing bauxites in which the weighted reactive silica content is lower than 5% of the alumina content of the bauxite. This process according to the Bayer cycle makes it possible to reduce by at least 50% the installed volume required to carry out the desilication process, because of the activation of this process, while maintaining an alumina extraction rate of at least 95% as well as a weighted $SiO_2$ sol./$Na_2O$ caust. content ratio of or less than 0.65% in the Bayer liquor after leaching.

The process according to the invention, which involves carrying out desilication of the gibbsite-bearing bauxite prior to leaching by a sodium solution the sdium hydroxide concentration of which ranges from 40 to 150 g/l of $Na_2O$ caustic, is characterised in that the said sodium solution contains a Bayer cycle washing water originating from at least one of the following sources: washing of insoluble residue, washing of production aluminium trihydroxide, washing of primer aluminium trihydroxide, and in that this washing water is mixed or otherwise with leaching liquor.

It has been noted, in effect, that the effectiveness of the process of desilication before leaching, expressed in terms of the ratio $SiO_2$ sol./$Na_2O$ caust. in the liquor, is greatest with an $Na_2O$ caustic concentration of the liquor placed in contact with the bauxite located halfway between 40 and 150 g/liter.

Table 1 makes it possible to judge the loss of effectiveness of the process both with low $Na_2O$ caustic concentration of the liquor, because of the slower kinetic rate of dissolution of the reactive silica, and with high $Na_2O$ caustic concentration of the liquor, because of the slower kinetic rate of precipitation of the sodium silico-aluminate.

TABLE 1

Desilication tests at 100° C. in the presence of bauxite with 1% reactive silica (Example 3) at the rate of 1000 g of dry bauxite per liter of sodium liquor $Na_2O$ g/liter concentration of sodium liquor

| | 44 | | 77 | | 150 | |
|---|---|---|---|---|---|---|
| Time (hours) | % $SiO_2$/ $Na_2O$ | % rate dissol. Kaolin | % $SiO_2$/ $Na_2O$ | % rate dissol. Kaolin | % $SiO_2$/ $Na_2O$ | % rate dissol. Kaolin |
| 1 | 0.96 | 25 | 0.78 | 60 | 1.76 | 79 |
| 2 | 0.79 | 45 | 0.47 | 87 | 0.92 | 96 |
| 4 | 0.55 | 70 | 0.30 | 98 | 0.66 | 100 |
| 6 | 0.41 | 81 | 0.28 | 100 | 0.55 | 100 |

There has also been noted a loss of alumina extraction yield caused by retrogradation, when desilication time of the suspension is in excess of 4 hours and when the Na$_2$O caustic concentration of the sodium liquor increases as indicated in Table 2 below.

TABLE 2

Loss of yield due to retrogradation during a 5-hour desilication process at 100° C.

| | | | |
|---|---|---|---|
| Na$_2$O g/l liquor concentration | 44 | 77 | 150 |
| Desilicated liquor Rp | 0.55 | 0.69 | 0.95 |
| % loss of yield | not detectable | 0.7 | 1.5 |

Intending to optimise other parameters such as the temperature and charge of bauxite placed in suspension in a specific volume of liquor, the claimant has pursued its experiments and shown that desilication performances improve considerably on increasing the temperature or the charge of bauxite, as indicated in Table 3 below.

TABLE 3

Tests at different temperatures and charges of bauxite with a liquor at 77 g Na$_2$O/liter

| | 100° C. | | 100° C. | | 95° C. | | 90° C. | |
|---|---|---|---|---|---|---|---|---|
| t/H* | Baux/Lig. % SiO$_2$/Na$_2$O | 1000 g/l % diss. Kaolin | Baux/Lig. % SiO$_2$/Na$_2$O | 650 g/l % diss. Kaolin | Baux/Lig. % SiO$_2$/Na$_2$O | 650 g/l % diss. Kaolin | Baux/Lig. % SiO$_2$/Na$_2$O | 1000 g/l % diss. Kaolin |
| 1 | 0.76 | 60 | 1.42 | 62 | 2.02 | 51 | 1.1 | 40 |
| 2 | 0.47 | 87 | 0.90 | 85 | 1.30 | 75 | 0.84 | 64 |
| 4 | 0.30 | 98 | 0.39 | 99 | 0.60 | 93 | 0.52 | 85 |
| 6 | 0.28 | 100 | 0.29 | 100 | 0.46 | 99 | 0.36 | 96 |

*t/H = time/Hours

Finally, optimisation of the desilication process at the point where it links up with subsequent leaching of the bauxite has led to setting, on the one hand, the fraction of reactive silica dissolved during desilication at more than 85% and preferably at more than 90% and, on the other hand, the silica concentration in the liquor at the end of desilication at a maximum of 0.9 times the silica concentration desired at the end of leaching. Under these conditions, leaching time can be reduced to the minimum required in order to achieve solubilisation of at least 95% of the extractible alumina. It emerges from these observations that, apart from the significant reduction of the time for desilication of the gibbsite-bearing bauxites with a low reactive silica content, achieved in an economical manner by using part of the washing water as sodium liquor for desilication, other advantages are derived from the process according to the invention, in particular:

limitation of yield losses by retrogradation,
a reduction throughout the Bayer cycle of the risks of major precipitation of sodium silico-aluminate and consequent formation of scale,
the production of alumina with a low silicon content (Si<100 ppm).

The process according to the invention and its implementation will be better understood from the description and examples of application which follow.

DESCRIPTION AND LAYOUT

FIG. 1 is a diagrammatic representation of a process for the treatment in Bayer cycle of gibbsite-bearing bauxites with a low reactive silica content according to the invention.

The sodium liquor A consisting of a fraction of the washing waters originating either from washing of the red mud A1 item 6, or from washing of the production aluminium trihydroxide A2 item 11, or from washing of the primer A3 item 13, or from a mixture of at least two of these washing waters mixed or otherwise with a fraction B2 of the leaching liquor B is used for preparing the suspension of crushed bauxite. Washing waters A1 and (or) A2 and (or) A3 may have undergone concentration by evaporation item 14 and (or) purification item 15.

The sodium liquor A is mixed in a crusher with the gibbsite-bearing bauxite mineral at the rate of 0.5 to 1.2 m$^3$ of liquor per tonne of bauxite to give a suspension S1. After crushing item 1, the suspension S1 is heated to between 80° and 100° C. in order to perform the desilication operation item 2. The suspension is maintained at this temperature for 2 to 10 hours in order to ensure a rate of transformation of at least 85% of the reactive silica into insoluble sodium silico-aluminate.

The desilicated solution S2 resulting from this operation is then placed in contact, for leaching item 3, with fraction B1 of the decomposed Bayer liquor B resulting from item 10 separation and possibly concentrated by evaporation item 14, for adjustment of the concentrations. The mixture, prepared in the proportion of about 5 m$^3$ of liquor B1 per tonne of bauxite contained in the suspension S2, is heated to between 100° and 170° C. for sufficient time to allow the extraction of at least 95% of the gibbsite contained in the bauxite.

The suspension S3 resulting from this operation is cooled, then diluted item 4 with fraction A4 supplementing the washing waters.

The suspension S4 resulting from this operation is then decanted item 5 to provide, on the one hand, alumina-enriched Bayer liquor B which after filtration item 7 is descomposed items 8, 9 and 10 before being recycled, and on the other hand red mud the washing waters A1 item 6 of which are recycled in the same manner as A2 or A3, either as desilication liquor A or as dilution liquor A4.

EXAMPLES OF APPLICATION

EXAMPLE 1

Bauxite at 47.5% Al$_2$O$_3$ in the form of gibbsite and 1% SiO$_2$ reactive (SiO$_2$/Al$_2$O$_3$=0.021).

desilication: crushing of one tonne of bauxite in the presence of 1 m$^3$ of clear 1st washer liquid originating from washing of the inert residue after leaching and containing 70 g Na$_2$O caustic per liter and 65 g Al$_2$O$_2$/liter. The suspension is heated to 100° C. in 3 series-mounted tanks ensuring desilication for 4 hours. The soluble silica concentration at the end of desilication is such that SiO$_2$ sol/Na$_2$O caust=0.3%.

leaching to extract the gibbsite-bearing alumina. After desilication the suspension is mixed with 5.1 m$^3$ of liquor containing 200 g Na$_2$O caustic per liter and 120 g Al$_2$O$_3$/liter. The extraction of alumina is carried out in 3 series-mounted tanks heated to 107° C. ensuring a contact time of 1 hour.

At this stage:
Rp=1.06.

The alumina is extracted with a yield of 97% and the ratio $SiO_2$ sol/$Na_2O$ caust. in the enriched liquor after leaching is 0.57%, which makes it possible to guarantee an alumina product silica content below 100 ppm with low scaling of the evaporators.

Results to be compared with tests 1 and 3 described in the State of the Art.

EXAMPLE 2

Same bauxite as Example 1.

desilication: crushing of one tonne of bauxite in the presence of 1 m³ of water from washing of the production trihydrate previously mixed with leaching liquor, containing 76 g of $Na_2O$ caustic per liter with Rp=0.57. The suspension is heated to 100° C. in 3 series-mounted tanks ensuring desilication for 4 hours. The soluble silica concentration at the end of desilication relative to $Na_2O$ caustic is 0.3%.

leaching to extract the gibbsite-bearing alumina by mixing with 4.95 m³ of liquor containing 140 g $Na_2O$ caustic per liter and 77 g $Al_2O_3$ per liter, at 140° C. for 15 minutes.

At this stage:
Rp=1.16.

The alumina extraction yield is 97% and the soluble silica concentration relative to $Na_2O$ caustic of the enriched leaching liquor is 0.58%.

This result is likewise to be compared with Test No. 5 described in the State of the Art.

We claim:

1. In a process for the production of alumina according to the Bayer process from a bauxite containing alumina principally in the form of gibbsite and silica in the form of alumina silicate with a content expressed in $SiO_2$ of less than 2.5% of the bauxite weight, comprising:

a principal circuit in which a sodium liquor called leaching liquor is aluminium-enriched by leaching of the said bauxite at a temperature usually ranging from 100° to 170° C., then separated from the insoluble residue resulting from leaching, then cooled to precipitate a part of the alumina which it contains in the form of alumina trihydrate in the presence of a primer of aluminium trihydroxide, then recycled as sodium leaching liquor after separation of the precipitated product aluminium trihydroxide and of the said primer;

supplemental circuits in which water is introduced to wash separately the insoluble residue, the product and primer, for generating sodium washing waters for recycle to the said main circuit; and providing evaporation means for compensating for the various water inputs;

the improvement comprising:

(a) placing the bauxite in contact with a sodium liquor containing washing water originating from at least one source selected from the group comprising:
    washing of the insoluble residues;
    washing of the production aluminium trihydroxide; and
    washing of the primer aluminium trihydroxide,
    said washing water having a soda concentration of 50 to 120 g/liter, expressed as $Na_2O$ caustic, and forming with the bauxite a suspension in which the volume of said washing water is less than 1.2 m³ per tonne of bauxite, which suspension is subjected to crushing;

(b) heating the suspension of crushed bauxite of (a) to temperature of from 80° to 100° C. for about 2 to 10 hours to effect desilication by transforming at least 85% of the alumina silicate of the bauxite into insoluble sodium silico-aluminate; and (c) recycling to the main circuit the suspension of (b) by placement in contact with the sodium leaching liquor for a sufficient period of time to dissolve, at the leaching temperature, at least 90% of the trihydrate contained in the bauxite.

2. Process according to claim 1, characterised in that the $SiO_2$ content in the form of alumina silicate is lower than 5% of the alumina content of the bauxite.

3. Process according to claim 1, characterised in that the desilication treatment time is sufficient to obtain a rate of transformation of at least 85% of the alumina silicate into sodium silico-aluminate and a soluble silica concentration in the solution such that the weighted ratio $SiO_2$ soluble/$Na_2O$ soluble is less than 0.9 times the same ratio in the leaching liquor.

4. Process according to claim 1, characterised in that the leaching liquor has a soda concentration expressed in $Na_2O$ ranging from 110 to 220 g/liter and a solubilised silica content in the leaching liquor such that the weighted ratio $SiO_2$ soluble/$Na_2O$ caust. ranges from 0.4% to 0.7%.

5. Process according to claims 1, 2, 3, or 4, characterised in that, after the desilicated suspension is placed in contact with the sodium leaching liquor, the temperature ranges from 100° C. to 160° C. and the time during which this temperature is maintained is sufficient to dissolve at least 95% of the trihydrate contained in the bauxite.

6. Process according to claims 1, 2, 3, or 4, characterised in that the soda and alumina concentrations in the suspension after leaching and the temperature are chosen in such a way that the soluble silica concentration at the balance of solubility of the sodium silicoaluminate under these conditions is such that the ratio $SiO_2$ sol./$Na_2O$ caust. is lower than or equal to the value of this ratio in the leaching liquor.

7. Process according to claim 1, characterised in that the fraction of washing waters taken in the Bayer cycle and consituting all or part of the sodium liquor intended to be placed in contact with the bauxite can undergo supplementary treatment comprising concentration or purification operations to remove undesirable soluble ipurities comprising carbonate and organic substances.

8. Process according to claim 1, characterised in that the desilication treatment time is sufficient to obtain a rate of transformation of at least 90% of the alumina silicate into sodium silico-aluminate and a soluble silica concentration in the solution such that the weighted ratio $SiO_2$ soluble/$Na_2O$ soluble is less than 0.9 times the same ratio in the leaching liquor.

* * * * *